United States Patent
Shmueli et al.

(10) Patent No.: US 9,305,284 B2
(45) Date of Patent: Apr. 5, 2016

(54) METHODS AND SYSTEMS FOR MANAGING A MULTI PARTICIPANT EVENT

(75) Inventors: Oded Shmueli, Nofit (IL); Royi Ronen, Jerusalem (IL)

(73) Assignee: Technion Research & Development Foundation Limited, Haifa (IL)

( * ) Notice: Subject to any disclaimer, the term of this patent is extended or adjusted under 35 U.S.C. 154(b) by 223 days.

(21) Appl. No.: 13/111,019

(22) Filed: May 19, 2011

(65) Prior Publication Data

US 2011/0289149 A1 Nov. 24, 2011

Related U.S. Application Data

(60) Provisional application No. 61/347,426, filed on May 23, 2010.

(51) Int. Cl.
*G06F 13/00* (2006.01)
*G06Q 10/10* (2012.01)

(52) U.S. Cl.
CPC ..................... *G06Q 10/10* (2013.01)

(58) Field of Classification Search
CPC .................................................... G06Q 10/10
USPC ........................... 709/204–207; 715/751–759
See application file for complete search history.

(56) References Cited

U.S. PATENT DOCUMENTS

| 7,856,470 B2* | 12/2010 | Raghav et al. | 709/204 |
| 2006/0271635 A1* | 11/2006 | Raghav et al. | 709/206 |
| 2010/0179998 A1* | 7/2010 | Matteini et al. | 709/206 |
| 2010/0180323 A1* | 7/2010 | Matteini et al. | 726/5 |
| 2011/0252011 A1* | 10/2011 | Morris et al. | 707/706 |

* cited by examiner

*Primary Examiner* — Kenneth R Coulter

(57) ABSTRACT

A method for managing communication among a plurality of social network members. The method comprises defining a multi participant task, setting at least one forward rule limiting the distribution an invitation message for participating in the multi participant task, forwarding the invitation message to at least one addressee from a plurality of social network members, allowing the at least one addressee to forward the invitation message to at least one additional addressee from the plurality of social network members under the at least one forward rule, monitoring a plurality of feedbacks to the invitation message to determine whether the multi participant task is achieved, and updating a status of the multi participant task according to the determination.

19 Claims, 6 Drawing Sheets

Protocol History

| FROM | TO | TYPE |
|---|---|---|
| 1 | 2 | A |
| 1 | 3 | A |
| 2 decides 'yes' | | |
| 2 | 4 | B |
| 4 | 6 | B |
| 4 | 3 | B |

| 3 decides 'yes' | | |
|---|---|---|
| 6 decides 'no' | | |
| 6 | 8 | B |
| 6 | 9 | B |
| 9 decides 'yes' | | |
| 9 | 4 (path) | C |
| 4 | 1 (path) | C |

| Value | Meaning |
|---|---|
| false | No forwarding allowed. |
| true, unlimited | Forwarding, with permission to forward further, allowed. |
| true, limited | Forwarding, without permission to forward further, allowed. |
| query, unlimited | Forwarding, with permission to forward further, but only to participants satisfying a specified query, allowed. |
| query, limited | Forwarding, without permission to forward further, but only to participants satisfying a specified query, allowed. |

Table 1: Forwarding Rights

| Value | Meaning |
|---|---|
| false | No feedback required on change of status. |
| query, $p$ | Feedback to $p$ is required on change of status only from participants satisfying the query. |
| true, $p$ | Feedback to $p$ is required on change of status. |

Table 2: Feedback

FIG. 6

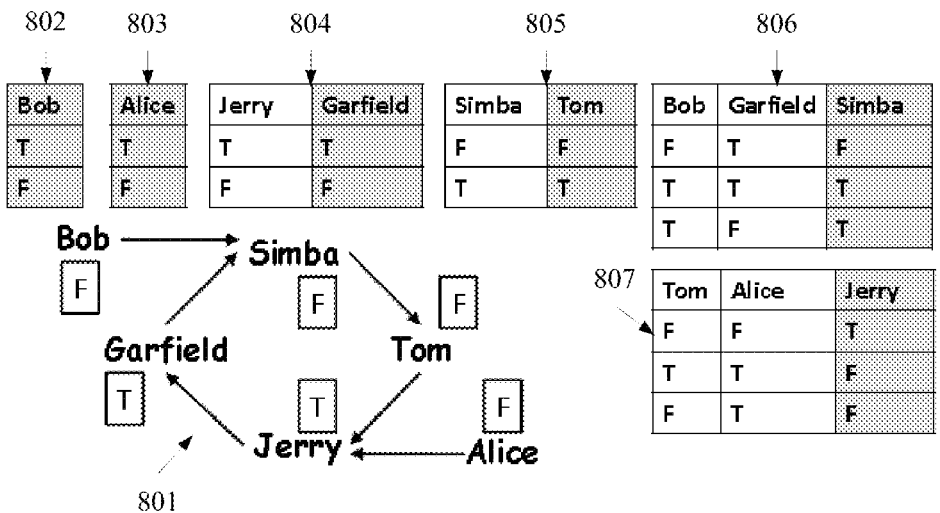
FIG. 8
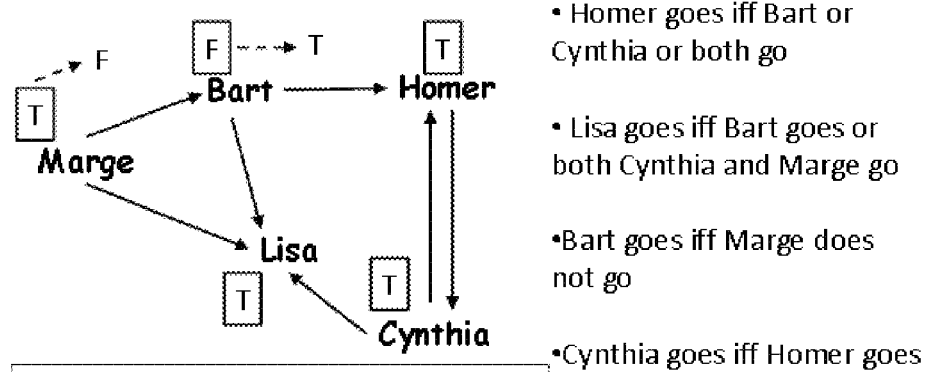
- Homer goes iff Bart or Cynthia or both go
- Lisa goes iff Bart goes or both Cynthia and Marge go
- Bart goes iff Marge does not go
- Cynthia goes iff Homer goes
FIG. 9
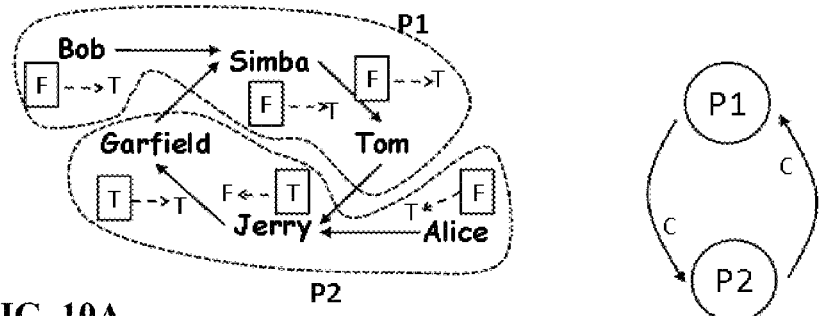 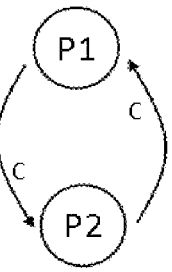
FIG. 10A
FIG. 10B

METHODS AND SYSTEMS FOR MANAGING A MULTI PARTICIPANT EVENT

RELATED APPLICATION

This application claims the benefit of priority under 35 USC 119(e) of U.S. Provisional Patent Application No. 61/347,426 filed May 23, 2010, the contents of which are incorporated herein by reference in their entirety.

FIELD AND BACKGROUND OF THE INVENTION

The present invention, in some embodiments thereof, relates to network communication and, more particularly, but not exclusively, to methods and systems of managing communication among a plurality of nodes in a network.

Social networks have recently become a prominent internet application. Networks such as Facebook™, MySpace™ and Twitter™ have gained enormous popularity. Social networks constantly continue to grow in terms users, connections, features and proliferation to new target audiences.

The popularity of social networks and their richness of features brought enormous amounts of data into the networks. The Claremont Report on Database Research, R. Agrawal et. al. The Claremont Report on Database Research. Berkeley, Calif., 200, which is incorporated herein by reference, points out social networks as an important example of the trend of 'Big Data'. According to this report, this trend will undoubtedly 'shake up' the data management field.

Some developments have made to turn social networks into an automated platform. One example for automation is the Facebook Query Language, which is a simple query language with which users query their own and their immediate friends' data, see Facebook Query Language. http://developers.facebook.com, 2009. Another query language, presented in R. Ronen, O. Shmueli. SoQL: A Language for Querying and Creating Data in Social Networks. ICDE Workshops, 2009, which is incorporated herein by reference, is a more expressive query language for social networks which uses path and group as data types. A model in which users use conjunctive queries in order to automatically add friends to their friends list, is proposed in R. Ronen, O. Shmueli. Evaluating Very Large Datalog Queries on Social Networks, published in EDBT 2009, which is incorporated herein by reference.

Another example for automation features involving intelligent communication between participants are a Facebook application, called 'Events', facilitates the organization of an event. The application automates invitation sending to friends, and collects 'attending', 'not attending' and 'may be attending' responses. Responses are visible to responders' friends. This is in fact a preliminary example for a protocol with structured communication, which runs on top of a social network.

SUMMARY OF THE INVENTION

According to some embodiments of the present invention, there is provided a method for managing communication among a plurality of social network members. The method comprises receiving, from a user, at least one forward rule limiting the distribution an invitation message for participating in a multi participant task, forwarding the invitation message to at least one addressee from a plurality of social network members, monitoring the forwarding of the invitation message by the at least one addressee to at least one additional addressee from the plurality of social network members under the at least one forward rule, and managing the distribution of the invitation message according to the monitoring.

Optionally, the method further comprises monitoring a plurality of feedbacks to the invitation message to determine whether the multi participant task is achieved and updating a status of the multi participant task according to the determination.

Optionally, each additional addressee may forward the invitation message to at least one further additional addressee from the plurality of social network members under the at least one forward rule and so on and so forth.

Optionally, the monitoring comprises allowing the at least one addressee of the invitation message to adjust the at least one forward rule and forwarding the invitation message with the at least one adjusted forward rule to the at least one additional addressee so that the at least one additional addressee may forward the invitation message to under the at least one adjusted forward rule.

Optionally, the monitoring comprises allowing the at least one addressee of the invitation message to add at least one new forward rule to the at least one forward rule and forwarding the invitation message with the at least one added forward rule to the at least one additional addressee so that the at least one additional addressee may forward the invitation message to under the at least one adjusted forward rule.

Optionally, the at least one forward rule defines at least one characteristic of a potential addressee of the invitation message.

More optionally, the method further comprises allowing at least one recipient of the invitation message to define at least one conditional rule for participation in the multi participant task; the monitoring comprises monitoring the fulfillment of the at least one conditional rule and determining whether the multi participant task being achieved according to the fulfillment.

More optionally, the at least one conditional rule defines at least one of an attendance of one of the plurality of social network members in the multi participant task and a nonattendance of one of the plurality of social network members in the multi participant task.

Optionally, the multi participant task comprises allocating at least one resource to a group of the plurality of social network members; further comprising adjusting the at least one forwarding rule according to the availability of the at least one resource.

More optionally, each of the plurality of feedbacks comprises a feedback required for completing the multi participant task.

More optionally, the feedback is selected from a group consisting of: a completion of a survey, acquisition of a product, a money transfer, joining a coupon group, and content uploading.

Optionally, the invitation message defines at least one validity rule limiting the validity of a feedback of the reception thereof.

More optionally, the at least one validity rule comprises a time limit constraint.

More optionally, the at least one validity rule comprises a survey completion constraint.

Optionally, the at least one forward rule comprises a black list of at least one of the plurality of social network members who are refused from participating in the multi participant task.

Optionally, the at least one forward rule comprises a white list of a group of allowed addressees from the plurality of social network members.

According to some embodiments of the present invention, there is provided a system of managing communication among a plurality of social network members. The system comprises a first user interface which allows a user to define an invitation message for participating in a multi participant task and at least one message forward rule limiting the distribution thereof, a second user interface which allows each recipient of the invitation message to select at least one addressee from the plurality of social network members and verifies that the at least one addressee complies with the at least one message forward rule, and a monitoring module which monitors a plurality of feedbacks to the invitation message to determine whether the multi participant task is achieved and updates a status of the multi participant task according to the plurality of feedbacks.

According to some embodiments of the present invention, there is provided a method for managing a multi participant process among a plurality of social network members. The method comprises monitoring a plurality of decisions indicative of a participation in a multi participant task of a plurality of social network members, setting, according to the monitoring, a plurality of stability statuses each for another of the plurality of social network members, detecting at least one first change, made by at least one of the plurality of social network members, in at least one of the plurality of decisions, notifying members of a group of the plurality of social network members which are socially connected to the at least one social network member about the at least one first change to allow each member to perform at least one second change in at least one respective of the plurality of decisions, updating respective stability statuses of the plurality of stability statuses according to the change, and determining whether the multi participant task is fulfilled or not according to the plurality of stability statuses.

Optionally, the decision of each social network member is recorded in a consistency table indicative of the decision of a respective group of the plurality of social network members which are socially connected thereto.

Optionally, the notifying is performed in a one-way communication architecture.

According to some embodiments of the present invention, there is provided a method for managing a multi participant process among a plurality of social network members. The method comprises using at least one global structure to model conditional relations between a plurality of multi participant decision process instances, monitoring a plurality of decisions indicative of a participation of a plurality of social network members in the plurality of multi participant decision process instances, updating a completion status of a first of the plurality of multi participant decision process instances according to the monitoring, and notifying a plurality of members of a second of the plurality of multi participant decision process instances about the updated completion status to allow the plurality of members to change decisions made during the second multi participant decision process instance.

Optionally, the at least one global structure comprise a commit abort graph (CAG) wherein each node represents a completion status of another of the plurality of multi participant decision process instances.

Optionally, the at least one global structure comprise a wait-for graph (WFG) wherein each node represents a stability status of another of the plurality of multi participant decision process instances; wherein the completion status is determined based on the WFG.

According to some embodiments of the present invention, there is provided a method for collecting funds for a multi participant task among a plurality of social network members. The method comprises setting an amount of funds required for achieving a multi participant task by a certain deadline, sending a plurality of messages to notify a plurality of social network members about the amount, the multi participant task, and the deadline, monitoring a plurality of feedbacks to the plurality of messages and the deadline to determine whether the multi participant task being achieved, and outputting the determination.

Optionally, the monitoring comprises calculating a reminder left for collecting the amount according to the plurality of messages and sending a plurality of update messages to notify the plurality of social network members about the reminder.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 6 depicts tables with explanations of forward rules values, according to some embodiments of the present invention;

FIG. 8 is a schematic illustration of connections in a group of connected social network members and respective consistently tables, according to some embodiments of the present invention;

FIG. 9 is a schematic illustration of message flow among exemplary nodes and a list of conditional terms for participation, according to some embodiments of the present invention;

FIG. 10A is a schematic illustration of a scenario at which nodes in two multi participant decision processes perform changes, according to some embodiments of the present invention; and FIG. 10B denotes a commit-abort graph corresponding with the multi participant decision processes depicted in FIG. 10A, according to some embodiments of the present invention.

DESCRIPTION OF EMBODIMENTS OF THE INVENTION

Figure 1:
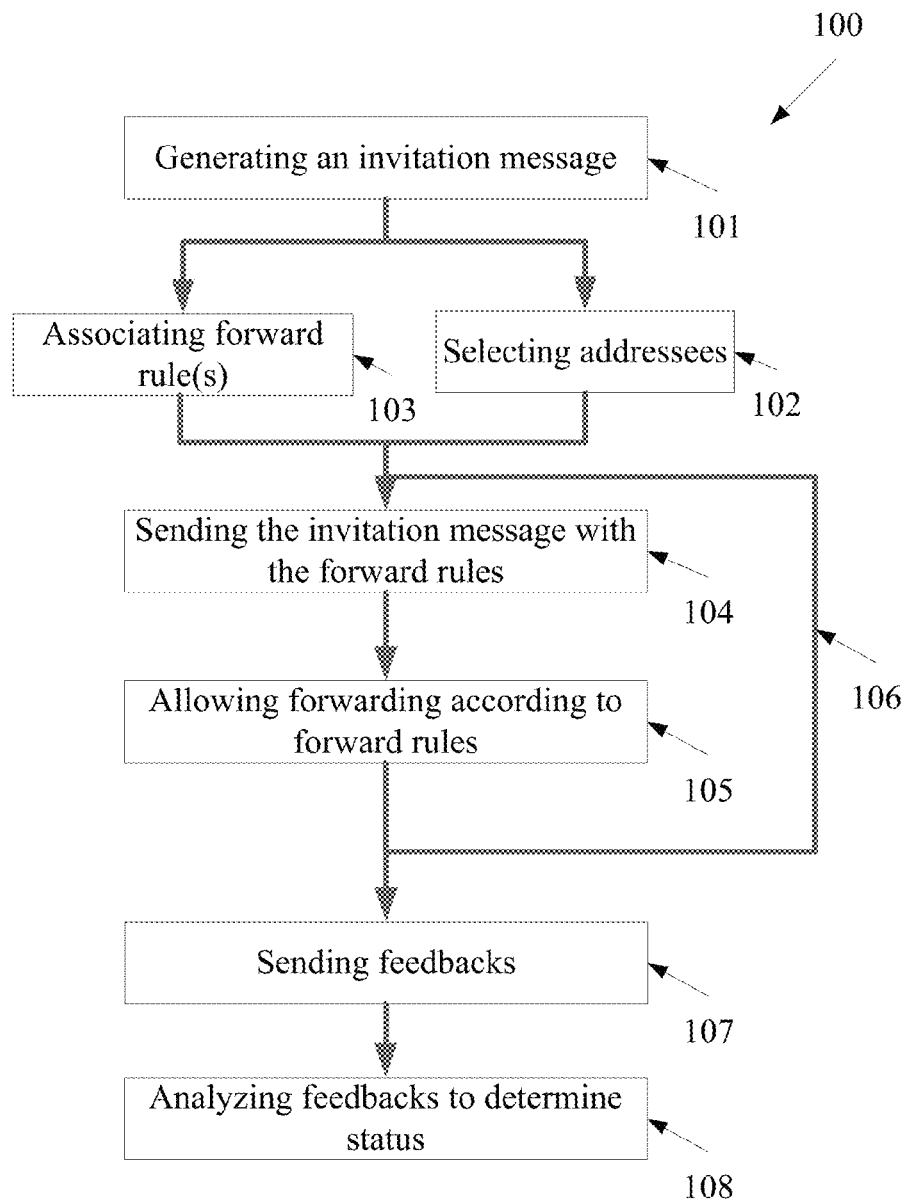
FIG. 1 is a flowchart of a method for managing communication among a plurality of social network members to achieve a multi participant task, according to some embodiments of the present invention.

The present invention, in some embodiments thereof, relates to network communication and, more particularly, but not exclusively, to methods and systems of managing communication among a plurality of nodes in a network.

According to some embodiments of the present invention, there are provided methods and systems for managing a multi participant decision process wherein a user can distribute an invitation to participate in a multi participant task, for example an event or a group purchasing instance, in a controlled manner among members of one or more social networks. Optionally, the initiator of the multi participant decision process defines the multi participant task, an invitation message to the multi participant task, and one or more forwarding rules that set a distribution policy. The distribution policy optionally defines the number and/or the type of addressees each recipient may correspond the invitation. The distribution policy may set rules pertaining to feedbacks to the received invitation message. For example, addressees may be required to respond to the invitation message within a certain period and/or with certain data, such as answers to a questionnaire. Optionally, some or all of the addressees may add forward rules to the invitation messages they send and/or adjust the received forward rules. Optionally, the forward rules are dynamic and change with the progress of the multi participant decision process, for example according to the responsiveness of the addressees. Optionally, some or all of the addressees may add conditional terms for their participation in the multi participant task. For example, an addressee may agree to participate only if another addressee also participate or does not participate in the multi participant task.

According to some embodiments of the present invention, there are provided methods and systems for managing a multi participant decision process in a manner that allows participating members of a social network to change their decision as long as the multi participant decision process is held. As the participating members are part of a social network, unidirectional and/or bidirectional connections are established thereamong. These connections are optionally used to determine which of the participating members has to be notified when a certain participating member changes his decision. Optionally, in order to allow the participating members to regret about decision they made in real time, a consistency table is updated for at least some of a plurality of the participating members. The consistency table of each member logs the status of the respective member and of members which are socially connected thereto.

According to some embodiments of the present invention, a plurality of multi participant decision processes are managed simultaneously in a manner that allows a participant to condition his participation in one multi participant task on the outcome of one or more multi participant decision processes of another multi participant task. The conditioning is optionally monitored using one or more global structures, such as graphs, for example a wait-for graph (WFG) and a commit-abort graph (CAG).

According to some embodiments of the present invention, there are provided methods and systems for collecting funds for a multi participant task, such as a gift, among a plurality of social network members. The method comprises setting an amount of funds required for achieving a multi participant task by a certain deadline, sending a plurality of messages to notify a plurality of social network members about the amount, the multi participant task, and the deadline, monitoring a plurality of feedbacks to the messages and the deadline to determine whether said multi participant task being achieved, and outputting the determination, for example presenting it to the participants.

Before explaining at least one embodiment of the invention in detail, it is to be understood that the invention is not necessarily limited in its application to the details of construction and the arrangement of the components and/or methods set forth in the following description and/or illustrated in the drawings and/or the examples. The invention is capable of other embodiments or of being practiced or carried out in various ways.

Reference is now made to FIG. 1, which is a flowchart of a method 100 for managing a multi participant decision process among a plurality of social network members to achieve a multi participant task, optionally common, for example a multi participant event according to some embodiments of the present invention. This method allows managing a multi participant decision process wherein a plurality of participants may decide whether they are interested to participate in a process for achieving a multi participant task or not. As used herein, the social network members are optionally entities, also known as nodes, of a network of connected entities, for example as an undirected graph, such as a social network. Each entity optionally represents a real world entity. The social network members may be referred to herein as participants. For instance, the social network members are subscribers of Facebook™, Twitter™, Myspace™, Linkedin™ and the like. A multi participant task may be the conducting of a multi participant event, for example an event in which a plurality of entities takes part. The multi participant event may be a group purchasing gathering, a fund raising action, a gathering event, a ticket distribution action, a creation of content, such as multimedia content, and the like. The multi participant task may be realizing a number of attendances in a multi participant event, a minimal and/or maximal number of attendances in a multi participant event, a collaborative work, such as the creation of an art piece, a shared document, a contract and the like.

The process 100 depicted in FIG. 1 is optionally monitored by one or more central computing unit(s). First, as shown at 101, an invitation message to participate in a multi participant task is defined by an initiator node, such as one of the network members and/or an automatic initiator, such as a software module, referred to herein as an initiator. For simplicity of the discussion, we describe initiation by a single initiator; however multiple members of a social network may initiate the process concurrently where a number of initiators may independently start instances related to the same multi participants event. The multi participant task may be conducting a multi participant event with a certain number of participants, performing a collaborative work, and/or taking part in a certain donation and/or action.

Figure 2:
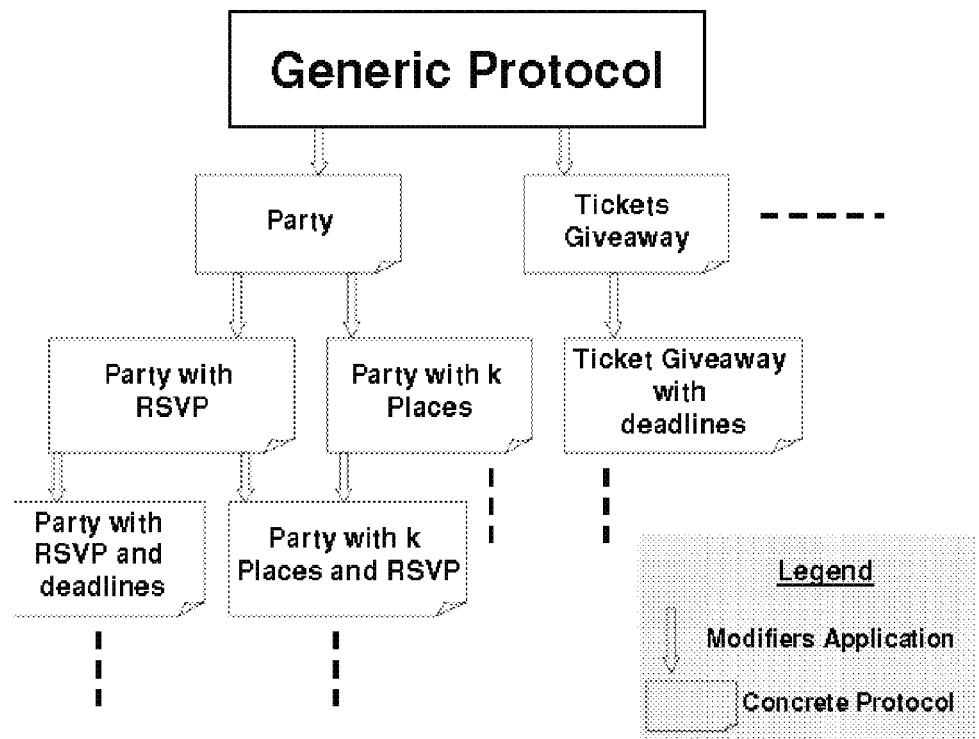
FIG. 2 is a graph of exemplary templates, according to some embodiments of the present invention.

Optionally, the type of the multi participant task, for example type of a multi participant event, is selected from a database which defines a plurality of templates for a plurality of different events. The template, also referred to as a modifier, is set according to expected behavior of participants in a process for recruiting participants for achieving the multi participant task. For example, FIG. 2 depicts a graph of exemplary templates. This database of templates is optionally as defined in J. Dean and S. Ghemawat, MapReduce: Simplified data processing on large clusters, In Proc. OSDI, 2004, which is incorporated herein by reference. The templates may be defined by inheriting from a general application program interface (API) class that captures a wide variety of cases, and functions that define various behaviors.

Now, as shown at 102, the initiator selects addressees, also referred to as recipients, for the invitation message from a plurality of social network members in a social network. For example, in the social network, the initiator, which is optionally a subscriber, selects a group of friends as addressees. As shown at 103, the initiator further associates one or more forward rules that define the terms for forwarding the invitation message by the addressees. These forward rules may define forwarding rights, namely the right to forward the invitation message to other social network members. It should be noted that the invitation message may be forwarded as a copy of the original invitation message, as a new message that is generated by the sender, and/or as a notification in an invitation system. These forward rules limit the distribution of the invitation message to addressees who comply with a certain policy and/or rule(s), for example part of one or more demographic segments, for instance in a certain age, part of a certain white list, not in a certain black list, living in a certain geographic area (country, neighborhood and the like), part of a certain group, such as pet owners, belonging to people above a certain height, members of an alumni, having a certain education, having a certain number of friends, having a certain type of friends, and the like. Optionally, the one or more forward rules define the number of invitees per addressee. Optionally, different forward rules are set for different addressees. For example, one type of addressees may forward the invitation message to no more than 4 more friends and another type of addressees may not forward the message to underage addressees. Optionally, the one or more forward rules define different restrictions to different levels of addressees.

As shown at 104, the invitation message is sent to the selected addressees, with the forward rules. The invitation message may be sent as an event notification, an email, an instant message (IM), and/or any other notification according to a respective social network methodology.

Figure 3:
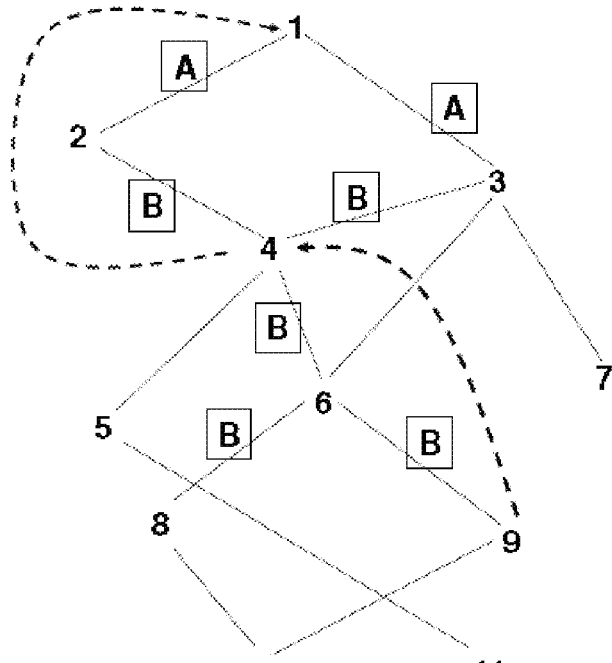
FIG. 3 is a table which defines possible values for exemplary forwarding rights, according to some embodiments of the present invention.

As shown at 105, each addressee may forward the invitation message she receives according to the associated forward rules. As described above, an addressee (first level) may forward the message to other addressees (second level) which may further forward the message to additional addressees (third level) and so on and so forth. Different limitations may be defined for addressees in different levels. For example first level addressees may forward the invitation to any number of second level addressees, however the second level addressees may be granted the right to forward the invitation message to only a limited number of addressees. Optionally, the rules are represented by values in a header for reducing the bandwidth and computational complexity which is associated therewith. For example, FIG. 3 depicts a table which defines possible values for exemplary forwarding rights.

As shown at 106, each one of the addressees may forward a received invitation message to one or more addressees from the network according to the associated forward rule(s). For example, forwarding can only be done to friends of the forwarder in one or more social networks.

It should be noted that the addressees may be selected from a number of different social networks which are provided by different operators, for example Facebook™, Twitter™ and LinkedIn™.

Optionally, as shown at 107, addressees who receive the invitation message may forward the message to different addressees they select in light of the forward message rule(s). This forwarding and/or the different addressees comply with the forward message rule(s). Addressees, who receive the invitation message from other addressees, may forward the invitation message to social network members (nodes) which are directly and/or indirectly connected thereto in a social network, for example to friends and/or friends of friends. Addressees may be referred to herein as participants.

For example, FIG. 3 depicts an exemplary segment of a social network wherein the method is implemented. The initiator, marked with 1, sends the invitation messages (A) to addressees 2 and 3. They forward the invitation messages to addressees 4, 6, and 7. The forwarded invitation message may be adjusted by the forwarders, for example as further described below. A forwarded invitation message is marked as message B. As shown in FIG. 3, the second layer addressees forward the message to third layer addressees (5, 6) and so on and so forth. Exemplary feedback messages are marked with a striped line. An exemplary recording of the process depicted in FIG. 3 is provided in the tables depicted in FIG. 4.

Optionally, the forwarding rule(s) are dynamic, for example change according to the availability of a resource, the current number of responding addressees, and/or changes in the cost target of the multi participant task (i.e. in fund raising task). For example, if the task is collecting a certain amount of funds for a common goal, such as a donation, a gift to a common friend and/or a multi participant event, the resource is the required certain amount and the availability of the resource is the sum of funds left to recruit the certain amount.

Optionally, the forwarding rule(s), which are set by the initiator and/or a forwarder, may be locked or unlocked for modifications. Locked forwarding rule(s) do not allow an addressee to change them before she forwards the invitation message to other addressee(s). Unlocked forwarding rule(s) may be changed and/or removed by the addressee before she forwards the invitation message to other addressee(s). Optionally, an invitation message may include locked and unlocked invitation messages.

Each one of the addressees of the invitation message may respond and/or required to respond to the received invitation message, for example by sending a response message, also referred to as a feedback, to a monitoring node, for example as shown at 107. The feedback may be sent directly to the initiator of the process, to a central unit which manages the reception of the feedbacks, and/or indirectly at a path of addressees which have forwarded the invitation message from one to another until it was received by the responding entity. The feedback may be indicative of accepting the invitation, declining the invitation, and/or postponing the decision how to respond to the invitation.

Optionally, an invitation message that includes a feedback requirement may include a query q. The feedback requirement may be for a literal answer, a completion of a task, such as acquiring a product and/or transferring money, uploading content, such as images and the like. This means that only participants who respond to the feedback requirement are registered as accepting the invitation message. Addressees who forward the invitation massage, which may be referred to as forwarders, may replace the feedback requirement with another feedback requirement and/or add new feedback requirement(s) to the invitation message. In such a manner, a forwarder adds requirements for participation in the multi participant event. Optionally, a feedback requirement set by a forwarder must include the feedback requirement set by the initiator.

Optionally, a feedback requirement defines a feedback deadline. By this deadline, the addressee has to respond whether she receives the invitation. If the deadline passes without a positive feedback, the feedback for the invitation to participate in the multi participant event is automatically considered as being negative. Optionally, a forwarder may change and/or add a feedback deadline to the invitation message. Optionally, the feedback deadline, which is set by the forwarder, is bound to the limitation(s) of feedback deadline(s) set by the initiator and/or one or more forwarders which have forwarded the invitation message thereto.

Now, as shown at 108, the feedback messages are received and analyzed to determine whether the multi participant task is achieved or not. This allows updating the status of the multi participant task according to the determination, for example achieved or not. Optionally, the feedback is made by updating a status associated with the respective addressee. The updating may be from idle to positive (yes) and/or negative (no).

It should be noted that the method described herein is optionally managed at a managing node that is connected to a communication network, such as the internet, for example a server.

Figures 4, 5:
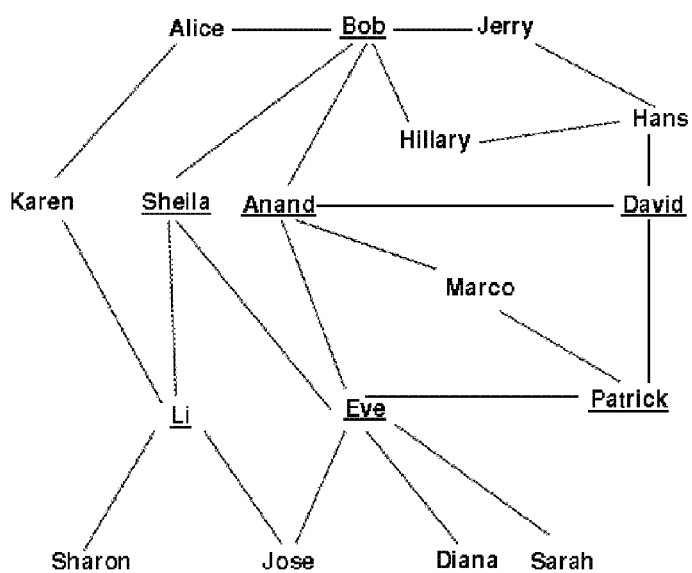
FIG. 4 depicts tables which are an example of the recording of the process depicted in FIG. 3, according to some embodiments of the present invention.
FIG. 5 is a schematic illustration of an unidirectional graph depicting a segment of a social network that takes part in a process for gathering social network members to achieve a multi participant task, according to some embodiments of the present invention.

Reference is now made to FIG. 5, which is a schematic illustration of a unidirectional graph depicting a segment of a social network that takes part in a process for gathering social network members to achieve a multi participant task, an alumni reunion party of a certain amount of alumni members, for example as many as possible, according to some embodiments of the present invention. It should be noted that names, which are used in this description, are indicative of nodes and therefore may represent an entity that is managed from a client terminal, such as a laptop, a desktop, tablet, and/or a Smartphone that is connected to a social network server via a communication network connection, for example over the internet.

The initiator, Bob, initiates a process for organizing a reunion party for university alumni. The multi participant task is to perform a multi participant event with as many as possible alumni and a few personal friends who are not alumni. As the initiator of the multi participant event, Bob sends invitation messages to non-alumni personal friends that he would like to invite and to alumni with whom he is connected in the social network. Bob defines different forward rules for different addressees. Bob defines the forward rules so that non-alumni invitees do not have the right to forward the invitation message to other people and alumni invitees may forward the invitation message to other alumni with whom they are connected. As described above, with relation to 106, not only Bob's direct friends can forward the invitation. Every addressee who receives the invitation message, who is an alumnus, may forward it further to other alumni. Alumni invitees who would like to attend, are required to send a feedback. For example, invitees are asked to send répondez s'il vous plait (RSVP) messages at least two days before the event. Optionally, each aluminous may send the invitation to one non-alumni invitee, for example under a forwarding rule that defines the non-alumni invitee as a spouse. Non-alumni invitees may not be required to send RSVP messages. At the graph segment illustrated in FIG. 5, a possible sequence of messages for Bob's process for organizing the reunion party on this network follows:

Bob initiates and sends two invitation messages, without forwarding rights, to Jerry and Hillary and three messages, with forwarding rights, to Hillary, Anand, and Sheila.

Jerry cannot attend, and responds accordingly.

Hillary responds positively (RSVP is not required from her). Note that none of Jerry or Hillary can forward the invitation.

Sheila could forward the message to Eve and Li who are alumni. She decides to forward only to Eve.

Eve does not respond positively, however she forwards the invitation message to Patrick.

Anand forwards the message to Eve and David, responds positively and sends Bob an RSVP.

After receiving the second invitation, Eve responds positively and sends an RSVP message.

Patrick forwards the invitation message to David.

A little before the deadline, David sends Bob an RSVP message.

Patrick does not send an RSVP on time. An automatic negative feedback is generated.

Reference is now made to another example wherein the multi participant task is distributing a resource, such as tickets to a concert, among network members. In this example Alice has k tickets to the concert. She forwards an invitation message to a number of network members with a forward rule that limits the number of friends each member invites. Optionally, positive feedbacks of the addressees, which are indicative of using the resource, are monitored to detect when and/or if the resource is exhausted. When the resource is exhausted, the forwarding rule dynamically changes to no forwarding rights. Optionally, the rate of exhaustion is monitored. In such a manner, the forwarding rules may be adjusted to increase the number of addressees who may forward the invitation message. For example, when more than 80% of the resource is free, each addressee receives the right to forward three invitations, when less than 50% of the resource is free each addressee receives the right to forward two invitations, and when less than 30% of the resource is free each addressee receives the right to forward one invitation. Optionally, an addressee may respond to an invitation message with an amount indicating the share of the resource she takes, for example the number of tickets when the resource includes available tickets. The amount selected by the addressee optionally includes the amount of invitation messages she forwards, or about to forward. In some cases, participants who do not exhaust an allocated resource, for example do use all forwarding rights, may be able to send a feedback indicative of their decision. The feedback, as described above, may be sent to the initiator, a managing center, and/or a plurality of addressees on the path from the initiator to the sender. Such a message includes the amount of resource returned.

Optionally, a monitoring module, which is optionally installed in a central server, monitors the distributed resource. For example, the monitoring module verifies, before an invitation message is forwarded, what left of the resource, for example how many available tickets are not distributed yet. This allows making sure that there is no overbooking.

A possible sequence of messages and feedbacks are as follows:

Alice has five tickets to share. She initiates an event and sends messages to Bob with a forward rule limiting the distribution to two tickets and to Karen with a forward rule limiting the distribution to three tickets. Karen responds positively, namely takes a ticket, and forwards an invitation massage to Li. Li takes a ticket and forwards an invitation message to Jose. Bob cannot attend the concert and therefore only forwards invitation messages to Jerry. Jerry takes a ticket and forwards an invitation message to Hans. Hans takes a ticket. Jose returns the ticket to Alice. The act of taking a ticket may be performed by a status changing.

Other examples, wherein the multi participant task is sharing a limited resource, are a dinner party with a limited number of participants and a carpool with a limited number of vacancies.

As described above, the initiator and optionally, the addressees (including the addressees of addressees), may freely forward the invitation message or associate forward rules which limit the distribution of the invitation message, for example as described above. For example, consider a very simple protocol, derived from the method 100, for setting a meeting between exactly two participants. The initiator sends an invitation message to a participant denoted herein as p, but without permission to forward. The addressee cannot forward the message further. If the addressee decides to attend the meeting, a positive feedback is made, for example by sending a message or changing a respective status.

In other cases, however, participants may want to give permission to forward, but only to a certain type of participants. For example, in the example depicted in FIG. 5 Bob allowed the invitation message to be forwarded only from one alumnus (alumnous) or alumna, referred to herein interchangeably as alumnus, to another. Optionally, addressees may forward the invitation message with different forwarding rules. The forward rules of addressees are optionally limited to rules which are stricter from the forward rules which are associated with the invitation message they received. For example, an exemplary participant p, who is allowed to forward messages, cannot give forwarding rights with which she has not been granted. For example, if p has (query q, unlimited) forwarding right, exemplary participant p cannot forward with (true, unlimited), see tables in FIG. 6 for further explanation. However, exemplary participant p may modify the right as long as only participants satisfying q can become aware. Exemplary participant p could therefore forward with right (query $q_0$, unlimited) where $q_0$ is contained in q, see, for example J. D. Ullman. Principles of Database and Knowledge Base Systems, Vol. I,II. C.S. Press, Rockville, Md., 1989, which is incorporated herein by reference. In this example, p may replace unlimited by limited, true by query or false, and query by false. Complying with these forwarding rights grant restrictions may be referred to herein as politeness.

Reference is now made to a mathematical description of an exemplary implementation of the above method. A social network from which the addressees are selected is optionally an undirected graph, denoted as (P; F), where P denotes a set of nodes (referred to as participants) and F denotes a set of undirected edges (representing direct connections between participants, for example friendship connections or following connections). As used herein, a participant is a social network member who optionally uses a client terminal that is associated therewith, even temporarily, for example a laptop, a desktop, a tablet, a Smartphone, a cellular phone with computing power and the like. Every participant has an internal database and optionally a client terminal having computing power, using which the participant may participate in the multi participant decision process for achieving the multi participant task, for example forming a multi participant event. Members of a social network may initiate multi participant decision processes and take decisions in such a multi participant decision processes, for example determine their status, for example among attending/not attending/maybe attending and/or among yes/no/maybe.

Optionally, each participant p is associated with four sets of event:

$I_p$ denotes a set of events initiated by p with one or more events regarding which p is positive, $Y_p$ denotes the set of participates who decided to participate (yes), $N_p$ denotes a set of one or more events regarding which p is negative, and $U_p$ denotes a set of one or more events regarding which p is undecided. In the case where $e \notin (I_p \cup Y_p \cup N_p \cup U_p)$ p unaware of e else p is aware of e. The four sets are mutually exclusive. These sets determine p's status regarding any event e of which p is aware of.

The method is realized by transmitting invitation messages among client terminals of network members. Every invitation message is associated with one or more measurable goals, such as multi participant events. Once a participant p receives an invitation message associated with an event e, p becomes aware of e and e appears in $U_p$. For the mathematical description, invitation messages are delivered in negligible time and are never lost and a unique global time is assumed.

After participant p becomes aware of event e, the status of p may be positive, negative or remain undecided. Either immediately after becoming aware or at a later point, p and only p may move e to $Y_p$ or $N_p$. p's addressees, for example friends in a social network or twitter followers, who are aware of e, can see p's status. Therefore, once e is in $Y_p$ or $N_p$, e cannot be moved further, since other participants may have used this information.

According to some embodiments of the present invention, addressees, who responded positively to invitation messages, may withdraw their willingness to participate or become willing to participate. In such a manner, a multi participant decision process of achieving a multi participant task, for example as depicted in FIG. 1, remains active even after the multi participant task is tentatively achieved. For example, the multi participant decision process does not stop when a certain number of addressees approved their participation in a multi participant event. The multi participant decision process continues until a realization of the multi participant event. During the process, addressees may withdraw their consent to participate in the multi participant event and/or in the efforts to achieve the common multi participant task. When such a withdraw is detected, a change in the status of an event may be made, for example from a completed state wherein the number of registered participant matches a desired number of participants, to a non-completed state wherein the number of registered participant does not match this desired number.

Figure 7:
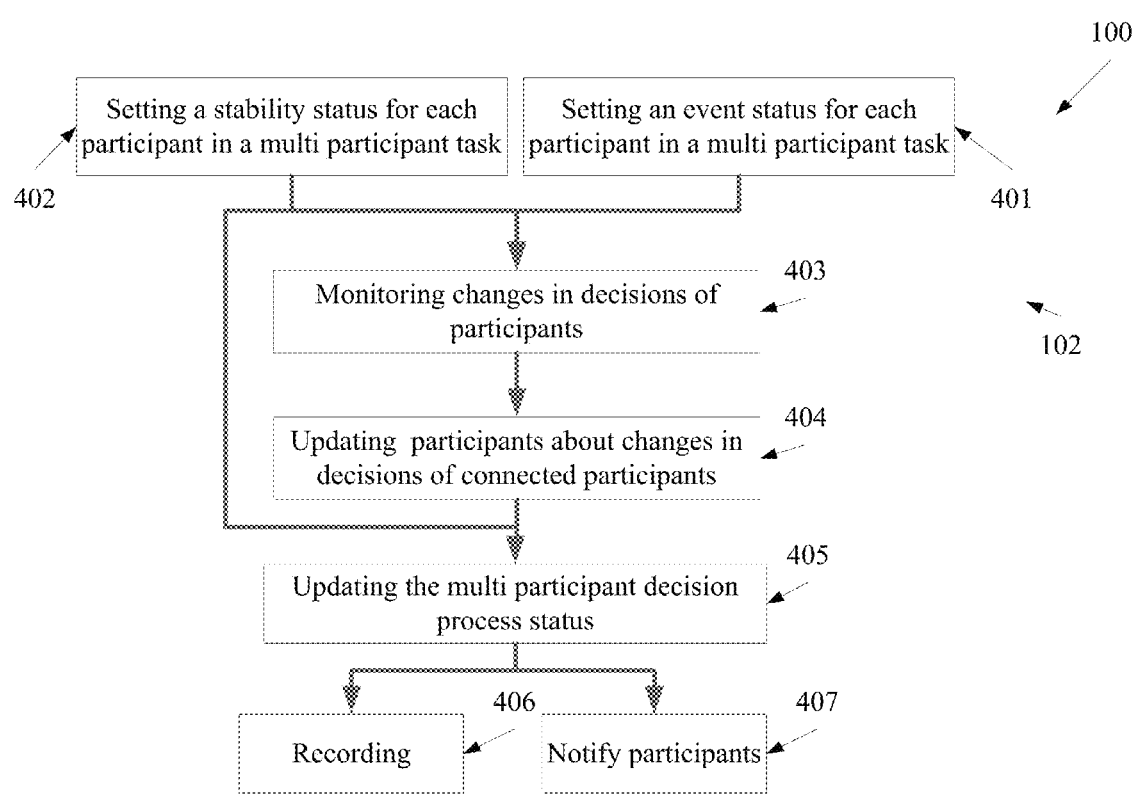
FIG. 7 is a flowchart of a method of managing a multi participant decision process that allows participants to change their decision while maintaining the consistency of multi participant decision process, according to some embodiments of the present invention.

Reference is now made to FIG. 7, which is a flowchart of a method of managing a multi participant decision process that allows participants to change their decision while maintaining the consistency of multi participant decision process, according to some embodiments of the present invention. The consistency is defined below.

Optionally, in order to allow participants to change their decisions, for example to withdraw their consent or lack of agreement to participate in an event, a predicate, such as implemented via a participant table, is associated with each one of them. The predicate, for example the participant table, lists all the combinations of status values of a participant p and of potential participants pertaining to p. Computing the natural join of all the participant tables gives all the states that are considered consistent by all participants in the network. Optionally, the participant table is a consistency table which abstracts the decisions of a certain participant. A participant, as described above, may take part in a multi participant decision process, such as a process in which addressees of invitation messages decide whether to participate in a multi participant event and/or to take part in endeavors to achieve a common goal. If a decision is made manually by users, the consistency table is a formalization of the perception of the participants. If automated or semi-automated tools make decisions, the consistency table is the output of a graphical user interface (GUI) and/or a tool which interactively obtains data indicative of a position if a user.

For brevity, a social network, such as Facebook™, Twitter™ and Google Buzz™, is represented by a directed graph (V; E) with reciprocal connections. E denotes a set of directed edges, representing connections between participants. An example for an inherently directed connection in a graph of a social network is a 'fan of' connection of Facebook™, and a 'following' connection of Twitter™. For describing these embodiments, a network model with a directed graph-based formalism is used. For example, given an edge (u,v), using Twitter terminology, v follows u. Given a participant p, the input for p's decisions, for example feedbacks to invitation messages, are decisions made by a participant q where (q, p)∈E (i.e., participants that p follows). As demonstrated in the examples, participants may indicate their decisions by changing status with respect to events or other multi participant tasks. For simplicity, various distinct multi participant tasks and decisions related thereto are assumed independent of one another so that in this example only one event, e, is referred to.

Participants' decisions pertaining to multi participant events and/or multi participant tasks disperse in the social network. Similarly to 'Facebook Events' decision values may be true (participating) or false (not participating). These are determined as an event e is dispersed in the network, and participants make decisions in accordance with their (consistency) requirements.

For brevity, the following definitions are set:

Statuses—every p∈V is associated with a status value, which is p's status with respect to e. Status values are denoted herein as {true, false}. It should be noted that any other statuses may be set, either binary or not, e.g. {red, green, brown}.

Consistency Tables—each p∈V is associated with a table $T_p$. $T_p$ has an attribute (i.e., column heading) for each participant that p follows, for example for each incoming edge, and an attribute for p. $T_p$ lists p's possible status decisions, for combinations of true/false statuses of participants that p follows. p is in a consistent state if $T_p$ contains a sequence of values (tuple) which corresponds to p's status and to the statuses of participants that p follows. Not all possible combinations of followed participants' decisions have to appear in the table. It should be noted that the tables are socially sensitive and therefore may remain private.

Consistency—the consistency is defined for a group of members which are taking part in the multi participant decision process, for example received an invitation message to participate in a multi participant task. This group is connected to one another, forming a network. For brevity, given such a group of connected nodes, a network, has a state S which is a function S mapping participants→{true, false}. The group is consistent (in state S) if all nodes, the participants, are in consistent state. That is, if S corresponds to a tuple in $\bowtie_{v|v \in V}$ ($T_v$), combinations of statuses which do not appear in $T_p$—for some of the participants p—may therefore not occur in a consistent state. Although we define consistency using a join operation, this join may not be computed due to privacy and computational complexity issues. As outlined above, the tables are optionally an abstraction of what a person would do, or an abstraction of the actions of an automated tool, if decisions are made automatically. For example, reference is now made to FIG. 8, which is a schematic illustration of connections 801 in a group of connected social network members, a network, and respective consistently tables 802-807. Each table belongs to the participant whose column is grey. The group is in a consistent state, corresponding to a tuple in the join of all tables pertaining to the group. If, for example, only Alice toggles status, Jerry is inconsistent. If all participants toggle their statuses, the network is once again consistent.

Optionally, the method is implemented in a one-way communication architecture in which information is sent from a node v to v to nodes which are directly connected thereto, for example followers in Twitter™, friends in Facebook™ and the like.

Optionally, the multi participant decision process(es) are managed by a network node, such as central units, for example one or more server(s), and/or by a number of computing unit, for example according to a cloud computing architecture.

The central unit administers the instances, and may send and receive messages and/or updates to and/or from every node. The system can work in one of two modes which affect its scalability to a large number of multi participant decision process instances:

1. Unlimited memory, in which the system may use as much memory as it wants; and
2. Constant memory, in which the system may only maintain a limited constant amount of data per multi participant decision process instance.

The constant memory mode is suitable to large scale social networks.

The method is optionally based on one-way constant memory communication which atomically transforms a social network, or a segment thereof, from one consistent state to another consistent state, following a request by a participant to change his decision, for example withdraw consent to participate in an event or in another multi participant task. As used herein, an atomic action and/or a process mean an action or a process wherein all and/or none of the changes persist in the network when the action and/or process terminate. For example, the following method may allow participants in a multi participant decision process to withdraw their consent to participate in a multi participant event and/or endeavors to achieve a common goal. As described below, a constant extra space per participant is used in order to realize transitions from one network state which satisfies all consistency requirements to another such state.

First, as shown at 401, the participation of a plurality of participants in an event is monitored and documented, for example by updating participation status values, for example yes and no.

As shown at 402, in addition to the documented records, for example status values, which are assumed to be consistent, each participant is tagged with a stability value, referred to herein as stability status, which is optionally binary, for example one of {stable, unstable}, initialized to stable.

As shown at 403, changes in the decisions of participants are monitored, for example by detecting a toggle in a participation status in a graphical user interface (GUI) that is presented to the participants. This allows, as shown at 404, updating participants about changes in decisions of connected participants. For example, whenever a node v changes a status event and/or a stability value, v's direct connections which participate in the multi participant decision process instance, referred to herein as followers, are notified automatically (the participation status is optionally a two-tuple), for example by a stability update message. If a certain participant changes his participation status, his stability status is changed to unstable. Upon the receipt of a stability update message, each following participant, denoted herein as u, remains at yes or no without changing u's participation status or decides change and changes its stability status to unstable. In such a manner, decisions are made based on all updates received so far. The stability status of the certain participant, and the stability statuses of participants who decided change, are toggled in case of commit, which is optionally done by an atomic operation that either installs all the changes or leaves stability statuses unaffected. In case of abort, none of the statuses of participants are toggled.

Now, as shown at 405, the status of the multi participant decision process instance is updated for example from commit to abort or vice versa, for instance as described below. Optionally, as shown at 406, participants which are involved in a multi participant decision process instance and their decisions are recorded. In addition, the recording includes to which participants commit and/or abort message(s) have to be sent (and eventually to send these messages). As discussed above, this option would potentially require large amounts of memory. As shown at 407, the participants of the multi participant decision process instance are notified about the status of the multi participant decision process instance. In such an exemplary model, a participant makes decisions based on the decisions made by his and/or her followed participants.

Optionally, participants take an active part in processing commit and abort messages. In this embodiment, the multi participant decision process instance progress is tracked by maintaining two counters, c and r for the instance; c denotes a number of paths in which the instance proceeds and r denotes a number of participants whose current decision is no. The two counters are initialized with r=0 and c=1. In case of a change of a decision by v, c is increased by the number of v's followers minus one. In case of a yes or a no decision, c decreases by 1. In addition, in case of a no decision, r is increased by 1. If a participant, whose last decision is no decides yes or change, r is decreased by 1. When c reaches 0, we say that the multi participant decision process instance ends, and the system may issues a commit (if r=0) or an abort (otherwise).

Optionally, each multi participant decision process instance receives a unique identifier (ID). These IDs may be used in order to identify which decision belongs to which instance. In such a manner, there is no need to review all the network members to determine the status of participants of a certain instance. Optionally, a commit or abort message is issued only to the initiator of the multi participant decision process instance. Followers may conclude whether the multi participant decision process instance commits or aborts, as can be seen in the pseudo-code for this protocol, which appears as in the following algorithms 1 (initiator) and 2 (Participant):

---
Algorithm 1:

1: decide change and change stability to unstable
2: wait for commit/abort message from system
3: if commit then
4:     toggle status;
5: end if
6: change stability to stable;
7: end wait for

---

Algorithm 2:

1: wait for stability and status changes from followed participants;
2: if sender is unstable then
3:     if v is stable then
4:         decide yes, no or change;
5:     else
6:         decide yes or no (assuming eventual commit);
7:     end if
8:     notify system of decision;
9:     if decision is change then
10:        change stability to unstable;
11:    end if
12: end if
13: if sender is stable /*commit or abort*/ then
14:    if v is unstable then
15:        if sender toggled status then
16:            toggle status and change stability to stable;
17:        else
18:            change stability to stable;
19:        end if
20:    end if
21: end if
22: end wait for

---

Optionally, the update message is presented to the respective participants as an instant message, a notification in a social network profile, a graphical update in a graphical representation of the participants of a certain instance and the like.

It should be noted that it is possible that a node receives more than one message, because of cycles in the social network graph, for example see Lisa in FIG. 9, which is a schematic illustration of message flow among exemplary nodes and a list of conditional terms for participation. According to the protocol, the node makes a new decision upon the receipt of each such message. The current decision (last) is considered. Since a decision may be made only after the receipt of a message, it necessarily precedes the abort or commit message. When the stability status of a participant is unstable, decisions are made assuming that the multi participant decision process instance will eventually commit.

Consider the scenario depicted in FIG. 9. Marge is the initiator of the multi participant decision process instance and is therefore unstable after a change decision where the multi participant decision process instance counter c is 2. Lisa receives this update, decides no and therefore remains stable where multi participant decision process instance counter r equals 1 and multi participant decision process instance counter c equals 1. Bart receives the update, decides change and becomes unstable. Horner and Lisa receive this update so that the multi participant decision process instance counter c equals 2. Both decide yes and the multi participant decision process instance counters c and r equal 0. When the counters are equal, the multi participant decision process instance ends without any participant who made a last decision that is no. The system issues a commit message to Marge. Marge toggles her status and the stability status becomes stable. Lisa and Bart receive the update, and Bart toggles status and becomes stable (Lisa and Horner are already stable). Then, the multi participant decision process instance ends.

According to some embodiments of the present invention, a plurality of multi participant decision process instances operate concurrently in order to enable multiple participants to initiate and manage multi participant decision process instances at the same time. In such embodiments, information about participants in one multi participant decision process instance may be used in one or more other multi participant decision process instances.

Moreover, we would like to allow multiple instances to access the same nodes, and let knowledge gained in one instance be used in another instance, for example as described below.

Optionally, the multi participant decision process instances are supported by two global structures, such as graphs, for example a wait-for graph (WFG) and a commit-abort graph (CAG). As in transactional systems, the WFG records waiting dependencies between multi participant decision process instances. The CAG is used to enable a high level of concurrency, where one instance takes advantage of work done by another instance. In the CAG, nodes are multi participant decision process instances. Directed edges are of two types: commit edge and abort edge. A commit edge, denoted herein as ((p,q),c) where p,q are nodes (respectively, abort edge, denoted ((p,q),a)) means that p may commit if q commits (respectively, if q aborts). This is in fact a decision that a participant can make, assuming a prospective abort or commit of another instance.

For example, FIG. 10A is a schematic illustration of a scenario in which a node, Jerry, decided in P1 to 'change provided that P2 commits', and a node, Simba, decided in P2 to 'change provided that P1 commits'. The corresponding CAG, which is optionally created by Algorithm 3, is the graph shown in FIG. 10B. The commit/abort status of each of P1, P2 may depend on the commit of the other, and therefore the commitment of both preserves consistency.

A node v is involved with multi participant decision process instance P1 if v is the initiator of P1 or if v received a message as a consequence of a decision in P1. For example, v is involved in one multi participant decision process instance, and receives a stability status update which indicates it is involved in another multi participant decision process instance. For example, a pseudo-code for this case, which generalizes a process to manage the involvement of v in any number of the instances may be defined as follows:

---

Algorithm 3

1: wait for stability and status changes from followed participants;
2: if not involved in any other multi participant decision process instance then
3:     switch to Algorithm 2;

---

Algorithm 3

4: else
5:     let P1 be the multi participant decision process instance in which v is involved;
6: end if
7: if sender is unstable then
8:     if v is stable (i.e., decided yes or no in P1) then
9:         if v decided no in P1 then
10:            decide one of yes, no or change;
11:        end if
12:    if v decided yes in P1 then
13:        decide one of the following decisions:
14:        1. yes provided that P1 commits, or
15:        2. yes provided that P1 aborts, or
16:        3. change provided that P1 commits, or
17:        4. change provided that P1 aborts, or
18:        5. one of no or yes or change;
19:    end if
20:    else
21:        decide one of the following: //v is unstable
22:        6. yes provided that P1 commits, or
23:        7. yes provided that P1 aborts, or
24:        8. change provided that P1 aborts, or
25:        9. one of no or yes;
26:    end if
27:    if decision is 1, 3 or 6 then
28:        add edge ((P2, P1),c) to CAG;
29:    end if
30:    if decision is 2, 4 or 7 then
31:        add edge ((P2, P1),a) to CAG;
32:    end if
33:    if decision is 8 // see line 24
34:        add edge (P2, P1) to WFG;
35:    end if
36:    if decision is change then
37:        change stability to unstable;//(of v)
38:    end if
39:    notify system of decision, WFG and CAG changes;
40: end if
41: if sender (say, Pi) is stable /*commit or abort*/ then
42:    if v is unstable then
43:        if sender toggled status then
44:            toggle v's status and change stability to stable;
45:        else
46:            change stability to stable;
47:            delete Pi and related edges from WFG, CAG.
48:            stop waiting for Pi (if waiting);
49:        end if
50:    end if
51: end if
52: end wait for

---

The ability to connect one multi participant decision process instance to another allows a participant to condition his decision in one multi participant decision process instance in the outcome of other multi participant decision process instance(s). For example, consider a participant p, involved in a multi participant decision process instance P1, which becomes involved in another instance P2. p may want to subject its decision in P2 to the outcome of P1, which determines the status of at least one participant that p follows. These dependencies are maintained in the CAG. The CAG is used in order to ensure that the concurrent execution of multi participant decision process instances (for the same event) transforms the network from one consistent state to another.

Algorithm 3 differentiates between three cases when v, which is involved in P1, receives stability status changes from an unstable participant that is not involved in P1. For brevity, U denotes a set of participants involved in P1 that v follows. For clarity, in these cases, v is updated about the statuses of $\{v\} \cup U$ after the commit and/or abort of P1:

(1) Lines 9-11. v decided no in P1, and therefore knows the statuses of any of $\{v\} \cup U$.

(2) Lines 12-19. v decided yes in P1, and therefore knows its own status, but does not know the statuses of participants in U.

(3) Lines 21-26. v decided change in P1, and therefore does not know its own status, and does not know the statuses of participants in U.

In the presence of multiple instances {P1, P2, ..., } corresponding sets {U1, U2, ...} are formed. Here, case (1) holds if v decided no in all $P_i$. If v decides yes in at least one of $P_i$, and does not decide change in any other, case (2) is held. If v decides change in at least one of $P_i$, case (3) is held. Note that according to the algorithm, v may not decide change in more than one $P_i$.

Algorithm 3 may be used as a one-way concurrent atomic algorithm for the general case of facilitating changing a decision made. In this algorithm, cases (1), (2) and (3) are selected according to the sets $U_i$.

It should be noted that, as shown at line 24 of the pseudo-code of Algorithm 3, that if P1 aborts, the decision of v in P 2 is change. In this case, the CAG is not used as even if P1 aborts, P2, which requires a change decision at v, may or may not commit. Therefore, the decision of v is postponed. The postponing is recorded in the WFG so there are no opposing decisions. This case coincides with decision 6, since v already decided change in P1, and if P1 commits, v's proper decision is yes rather than change.

As discussed above, a participant may decide multiple times in the same protocol instance. As shown in the pseudo-code of Algorithm 3, updates from stable participants, for example updates which follow a commit or abort of an instance, are managed. The Algorithm further allows a participant to be involved in more than two multi participant decision process instances.

It should be noted that the pseudo-code of Algorithm 3 is suitable for monitoring the decisions of the initiator. However, the initiator, for example of P1, which is involved in another instance, for example other than P1, can only make a decision 6, 7, 8 and 9 since the initiator is necessarily unstable.

As discussed above, commit and abort messages may be sent to initiators of multi participant decision process instances. For concurrency control, the WFG and the CAG are maintained, for example by the central server, which decides whether to send commit or abort messages accordingly. A pseudo-code for making such a decision, for example by the central server, is described in Algorithm 4:

---
Algorithm 4
---
```
1: wait for decision notifications or graph change from participants
2: if decision notification indicates instance P finishes then
3:     if there is an edge ((P,·),c) or ((P, ·),a) in CAG, or (P, ·) in WFG then
4:         insert P into set F;
5:     else
6:         send commit or abort to P's initiator;
7:     end if
8: end if
9: if change is in WFG and creates a cycle then
10:    invoke algorithm A1 and abort one instance; //see discussion
11: end if
12: if change is in CAG and creates a cycle of instances in F then
13:    invoke algorithm A2, send abort or commit to all instances in F
        according to A2's result. //see discussion
14: end if
15: end wait for
``` where A1 denotes any algorithm which chooses one node, referred to herein as a victim, from a cycle in the WFG to allow aborting the corresponding protocol instance, thus resolving a deadlock. Alternative deadlock resolution could be timeout-based on G. Weikum, G. Vossen: Transactional Information Systems. Morgan Kaufmann, CA, 2002 and P. A. Bernstein, V. Hadzilacoa, N. Goodman: Concurrency Control and recovery in Database Systems, Addison-Wesley, MA, 1987, which are incorporated herein by reference. A2 denotes any algorithm which operates on finished protocol instances in the CAG and decides, for each instance, whether it is aborted or committed without contradicting the dependencies in the CAG.

Optionally, A2 is optimized by committing the highest possible number of finished instances.

According to some embodiments of the present invention, a centralized protocol in which the central unit hosts or connected to another unit which hosts, the respective social network. The central unit sends and receives the update, invitation, and/or feedback messages from the participants which are involved in the multi participant decision process instances. Optionally, the central unit manages the multi participant decision process according to the topology of the social graph. Participants send and receive messages from the central unit rather than from client terminals which are used in the network.

According to some embodiments of the present invention, two-way communication architecture is implemented. In such embodiments, even if edges are directed, messages may be sent between any two connected participants in both directions. This two-way communication architecture is similar to the one-way protocol, however participants do not send their decisions to a central unit. Instead, decisions are sent back to the participant who sent a change of status message, for example over peer to peer connections.

Notifications which are necessary for the construction of the CAG and the WFG may be sent to a central unit. For example, the initiator may receive feedback from all participants involved in the protocol, and then issue commit or abort messages, as described above.

It is expected that during the life of a patent maturing from this application many relevant systems and methods will be developed and the scope of the term a central unit, a computing device, a client terminal, a social network , and a node is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", an and the include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental support in the following examples.

EXAMPLES

Reference is now made to the following examples, which together with the above descriptions, illustrate some embodiments of the invention in a non limiting fashion.

The following examples demonstrate the usefulness of the above described methods and systems by providing examples for the richness of possibilities to create social protocols derived from the presented generic protocol.

Setting Meetings

Couple meeting example: a simple protocol for setting a meeting between two participants is implemented by sending the following exemplary message to a single participant p (an initiation message):

(Event=$e_0$; Type=A; Forwarding=false; Feedback=(p, true))

A response (feedback) message with an RSVP is required when (and if) the recipient responds positively to the invitation message. By this, the meeting is set.

Meeting a Few Example

Another example is that of one participant who invites a few people to a meeting. In this case, the same message as in the previous example is sent to all invitees. Note that the invitees may well be connected in the social network, and therefore a decision made by one participant is an input to the other's decision component. If the initiator wants a deadline for the feedback, an exemplary message is:

(Event=$e_1$; Type=A; Forwarding= false; Feedback=(p, true); Deadline=12:30)

Meeting with Different Roles

Not all messages associated with $e_0$ need be the same. Consider, for example, a case where a group manager would like to present a project to his manger(s). He invites group members as in the previous example, but the invitation to his manager includes forwarding rights:

(Event=$e_2$; Type=A; Forwarding=true; Feedback=(p, true); Deadline=12:30)

Organizing Parties

A formal party. The following initiation message is sent by p, the initiator of a formal party, in which every participant may bring exactly one partner, who cannot bring a partner or forward respective invitation messages.

(Event=$e_3$; Type=A; Forwarding=(true, limited); Feedback=(p, true); Deadline=13:00)

where p' denotes one of the recipients. The following subsequent forwarding message is sent by p':

(Event=$e_3$; Type=B; Forwarding=false; Feedback=(p', true); Deadline=11:00)

Note that further forwarding is not allowed, the deadline is 11:00 rather than 13:00, and feedback is to be sent to p'. Upon receiving a feedback from another participant, p' may send a feedback to p:

(Event=$e_3$; Type=C; Status=Yes)

A Surprise Party p1 would like to organize a surprise party for p2. Participants must be direct friends of p2, and p2 should not be aware of the party. p1 can use the social network in order to invite friends of p2 (with whom p is not necessarily directly connected). Let $Q_1$ be a query satisfied by participants who are directly connected to p2 (and are not p2 herself). The following is the message which starts the protocol. p1 locked the forwarding rules, which means that if the message is forwarded, the respective forwarding rules are not changed.

(Event=$e_4$; Type=A; Forwarding=(q1, unlimited), locked; Feedback=false)

An Open Party

The following initiation message is used to promote a party that is open to everyone:

(Event=$e_5$; Type=A; Forwarding=(true, unlimited); Feedback=false)

Resources

The following initiation message is used to distribute tickets to an event. Alice's ticket giveaway in the example above starts with the following two messages:

(Event=$e_6$; Type=A; Forwarding=(true,unlimited); Feedback=(false),locked; Resource=(3,1); and (Event=$e_6$; Type=A; Forwarding=(true, unlimited); Feedback=(false), locked; Resource=(2,1))

The first invitation message, with forwarding rights to forward the invitation message until three tickets are marked as taken, is sent to Karen. The second invitation message, with forwarding rights to forward the invitation message until two tickets are marked as taken, is sent to Bob. Karen's forwarding message to Li is as follows:

(Event=$e_6$; Type=B; Forwarding=(true, unlimited); Feedback=false, locked; Resource=(2,1))

A feedback message for returning two tickets is:

(Event=$e_6$; Type=C; Resource=2)

A Dinner Party with k Places

Here, the resource is k places in a dinner party initiated by p. The invitation is to participants distant at most two edges from p (or, satisfying $q_2$). Each initial invitee receives $k_0$ places. Each participant that responds positively may take up to two places. Note that this is different than the limited forwarding privilege discussed above. Here, giving the second place is not a part of the protocol (as a consequence, a participant need not necessarily give the place to someone who satisfies q2):

(Event=$e_7$; Type=A; Forwarding=($q_2$, unlimited); Feedback=(p, true), locked; Resource=(k',2))

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A system for using at least one computer server for managing a distribution of an invitation message to client terminals of a plurality of social network members over a communication network, the system comprising:
    at least one computer server comprising:
        a memory storing a code; and
        a processor coupled to the memory, and executes the stored code, the code comprising:
        code instructions for receiving, from a user client terminal over a communication network, an invitation message and at least one forward rule defined by a user, wherein said at least one forward rule limits the distribution of said invitation message for participating in a multi participant task, said at least one forward rule being associated with said invitation message and defining at least one potential addressee characteristic of a potential addressee of said invitation message;
        code instructions for forwarding said invitation message over said communication network to at least one addressee client terminal associated with at least one addressee from a plurality of social network members; and
        code instructions for receiving over said communication network a selection of at least one additional addressee made by said at least one addressee;
        code instructions for verifying a compliance of said at least one additional addressee with said at least one forward rule by said computer server;
        code instructions for managing a distribution of said invitation message according to said compliance, said distribution is performed by a transmission of said invitation message to said at least one additional addressee client terminal over said communication network;
    wherein said code instructions for verifying a compliance comprises code instructions for verifying that said additional addressee has made a selection of at least one defined potential addressee characteristic, thereby ensuring that said distribution of said invitation message is limited in accordance with said forward rule.

2. The system of claim 1, wherein said code further comprising the following code instructions which are executed by said processor:
    code instructions for monitoring a plurality of feedbacks to said invitation message to determine whether said multi participant task is achieved; and
    code instructions for updating a status of said multi participant task according to said determination.

3. The system of claim 2, wherein said code further comprising the following code instructions which are executed by said processor: code instructions for receiving an input from at least one recipient of said invitation message to define at least one conditional rule for participation in said multi participant task; wherein said code instructions for managing comprises code instructions for monitoring the fulfillment of said at least one conditional rule and code instructions for determining whether said multi participant task being achieved according to said fulfillment.

4. The system of claim 3, wherein said at least one conditional rule defines at least one of an attendance of one of said plurality of social network members in said multi participant task and a nonattendance of one of said plurality of social network members in said multi participant task.

5. The system of claim 2, wherein each of said plurality of feedbacks comprises a feedback required for completing said multi participant task.

6. The system of claim 5, wherein said feedback is selected from a group consisting of: a completion of a survey, acquisition of a product, a money transfer, joining a coupon group, and content uploading.

7. The system of claim 1, wherein said at least one additional addressee uses said at least one addressee client terminal for forwarding said invitation message to at least one further additional addressee from said plurality of social network members under said at least one forward rule.

8. The system of claim 1, wherein said code instructions for managing comprises code instructions for adjusting said at least one forward rule according to an input from said at least one addressee and code instructions for forwarding said invitation message with said at least one adjusted forward rule to said at least one additional addressee so that said at least one additional addressee may forward said invitation message under said at least one adjusted forward rule.

9. The system of claim 1, wherein said code instructions for managing comprises code instructions for adding at least one new forward rule to said at least one forward rule and code instructions for forwarding said invitation message with said at least one added forward rule to said at least one additional addressee so that said at least one additional addressee may forward said invitation message to under said at least one adjusted forward rule.

10. The system of claim 1, wherein said multi participant task comprises allocating at least one resource to a group of said plurality of social network members; wherein said code further comprising the following code instructions which are executed by said processor: code instructions for adjusting said at least one forwarding rule according to the availability of said at least one resource.

11. The system of claim 1, wherein said invitation message defines at least one validity rule limiting the validity of a feedback of the reception thereof.

12. The system of claim 11, wherein said at least one validity rule comprises a time limit constraint.

13. The system of claim 11, wherein said at least one validity rule comprises a survey completion constraint.

14. The system of claim 1, wherein said at least one forward rule comprises a black list of at least one of said plurality of social network members who are refused from participating in said multi participant task.

15. The system of claim 1, wherein said at least one forward rule comprises a white list of a group of allowed addressees from said plurality of social network members.

16. The system of claim 1, wherein said at least one potential addressee characteristic is at least one demographic segment of said potential addressee.

17. The system of claim 1, wherein said at least one potential addressee characteristic is a belonging of said potential addressee to at least one group of potential addressees.

18. The system of claim 1, wherein said at least one potential addressee characteristic is at least one of a number of friends said potential addressee has and a type of friends said potential addressee has.

19. A system of using at least one computer server for managing a distribution of an invitation message to client terminals of a plurality of social network members over a communication network, the system comprising:
   at least one computer server having:
      a memory storing a code; and
      a processor coupled to the memory and executes the stored code, the code comprising:
   code instructions to present on at least one client terminal a first user interface and to receive from a user via said first user interface an input defining an invitation message for participating in a multi participant task and at least one message forward rule limiting the distribution thereof, wherein said at least one message forward rule defines at least one potential addressee characteristic of a potential addressee of said invitation message;
   code instructions to present on said at least one client terminal a second user interface and to receive from each recipient of said invitation message via said second user interface a selection of at least one addressee from said plurality of social network members;
   code instructions to verify a compliance of said at least one addressee with said at least one potential addressee characteristic and with said at least one message forward rule;
   code instructions to manage a distribution of said invitation message according to said compliance, said distribution is performed by a transmission of said invitation message to said at least one addressee client terminal over said communication network
   code instructions to monitor a plurality of feedbacks to said invitation message received over said communication network at said at least one computer server; and
   code instructions to determine based on an analysis of said plurality of feedbacks whether said multi participant task is achieved and updates a status of said multi participant task according to said plurality of feedbacks.

* * * * *